Nov. 28, 1939.  H. MORRISON  2,181,604
ABRASIVE TOOL GUIDING APPARATUS
Filed Dec. 17, 1936  3 Sheets-Sheet 2

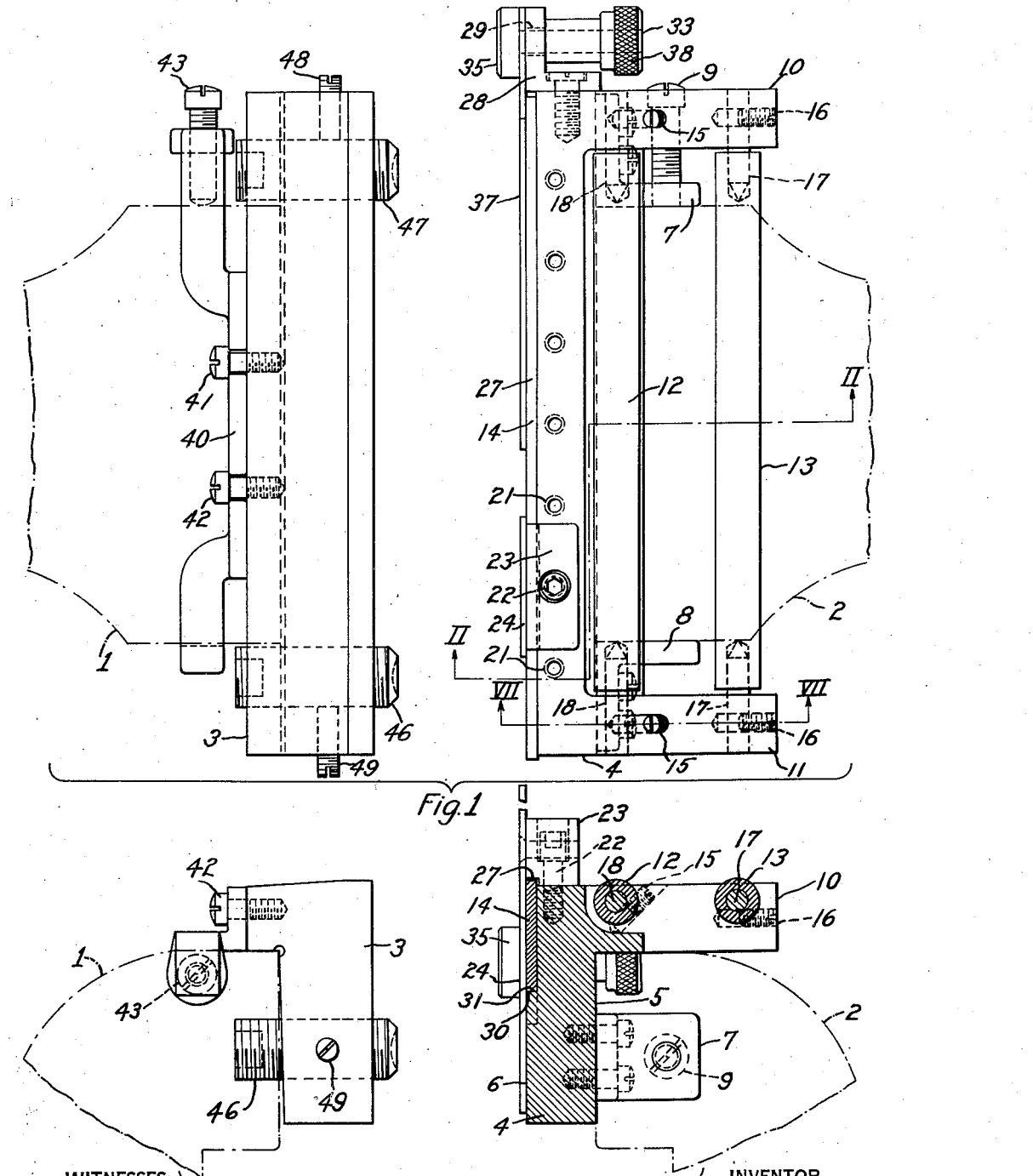

INVENTOR
Harry Morrison.

Nov. 28, 1939.   H. MORRISON   2,181,604
ABRASIVE TOOL GUIDING APPARATUS
Filed Dec. 17, 1936   3 Sheets-Sheet 3
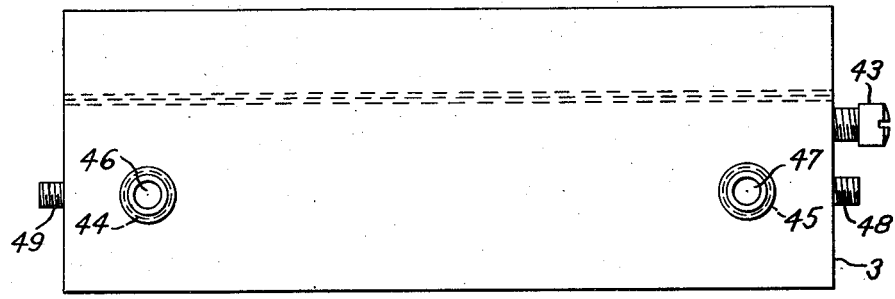
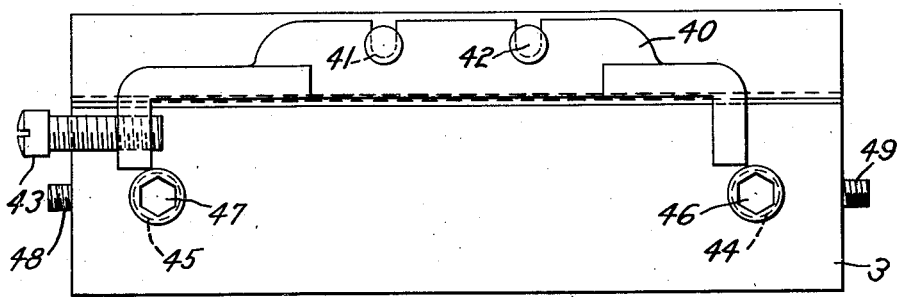
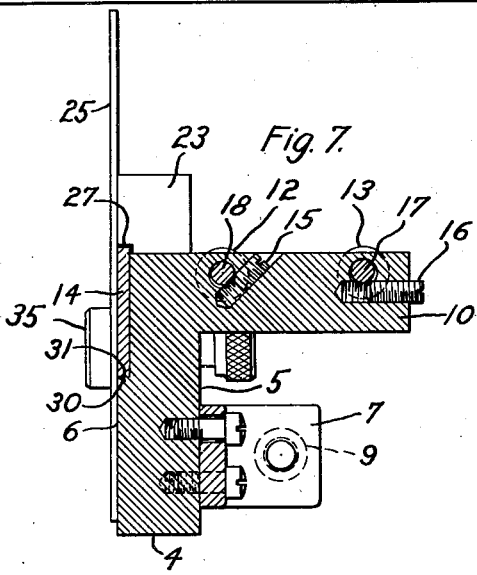
WITNESSES:
INVENTOR
Harry Morrison.
BY
ATTORNEY Patented Nov. 28, 1939

2,181,604

UNITED STATES PATENT OFFICE 2,181,604

ABRASIVE TOOL GUIDING APPARATUS

Harry Morrison, Pittsburgh, Pa.

Application December 17, 1936, Serial No. 116,336

5 Claims. (Cl. 29—76)

My invention relates to apparatus for guiding a manually operable abrasive tool, such as a file, on a work piece, and more particularly, my invention relates to attachments for a vise for holding a work piece and by means of which attachments a manually operable abrasive tool, such as a file, rasp, polishing tool, etc., may be guided so that all parts of the edge of a work piece fall in susbtantially the same plane which plane may, however, be disposed at any angle to any given finished surface of the work piece.

In manually operating a flat abrasive tool, such as a file, on a work piece, held in a vise, it is very difficult, if not impossible, even for a highly skilled craftsman, to produce a surface, all parts of which fall substantially in the same plane, nor is it even possible to produce an edge on a work piece, all parts of which fall substantially in the same line.

I am, of course, aware that attempts have heretofore been made by others and also myself to provide guiding means for an abrasive tool, which attempts were directed to the production of even finished surfaces on work pieces by means of guides for files, but such attempts, as far as known to me, have not produced apparatus having the novel, useful, and advantageous characteristics of my present invention.

One object of my invention is the provision of means for producing more accurately finished articles from a work piece operated upon by a manually operable abrasive tool which more accurately finished articles may be produced with less effort, in less time and with less waste of material.

Another object of my invention is the provision of guide means for abrasive manually operable tools.

A still further object of my invention is the provision of means for so positioning and holding a work piece and for guiding a manually operable abrasive tool with reference to the work piece that entirely even surfaces may be cut on the work piece, which surfaces may have any selected angular relation to a finished surface on the work piece.

Other objects and advantages will become more apparent from a study of the following specification and the accompanying drawings, in which:

Figure 1 is a plan view of my attachments shown applied to the jaws of a conventional vise;

Fig. 2 is an end view, with parts in section, on line II—II of Fig. 1, of my attachments again shown applied to a vise;

Fig. 5 is a front view of the attachment shown at the left in Fig. 1, on the rear jaw of the vise;

Fig. 6 is a rear view of the subject matter shown in Fig. 5; and

Fig. 7 is a detail, in section on line VII—VII of Fig. 1, showing how the rollers shown at the right in Figs. 1 and 2 are held in proper position.

Figure 3:
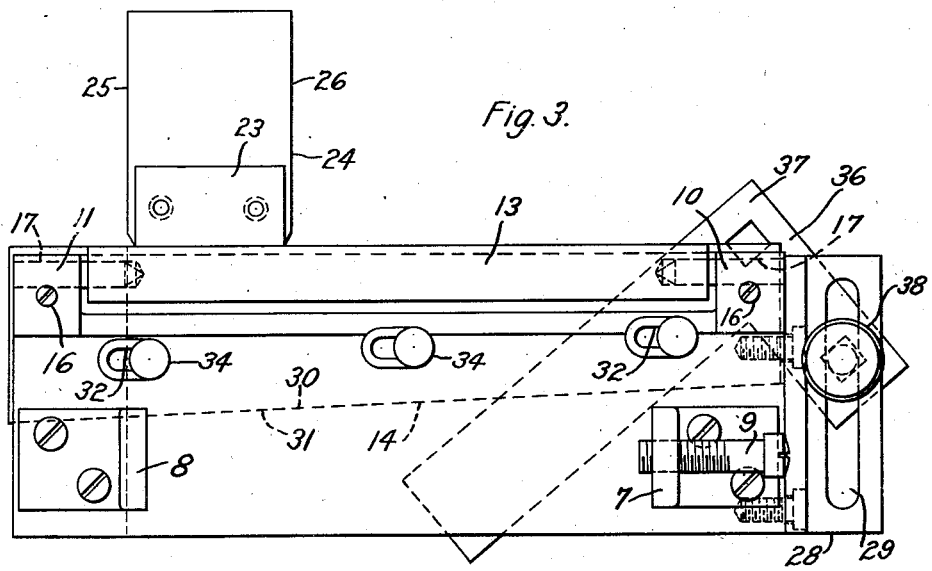
Fig. 3 is a front view of the attachment shown at the right or front jaw of the vise shown in Fig. 1.

In Figs. 1 and 2, I have shown, in broken line, the jaws of an ordinary bench vise providing the stationary or rear jaw 1 and the movable or front jaw 2. Mounted respectively on these jaws 1 and 2 are a pair of detachable members 3 and 4.

Mounted on the front or right-hand jaw 2 of the vise is a substantially rectangular bar member 4, as hereinbefore mentioned, which bar 4 has faces 5 and 6 that are substantially parallel to the work piece engaging surface of the jaw 2. rigidly mounted on the frame portion 4 adjacent each end thereof are L-shaped members 7 and 8 which have their base portions spaced a distance apart somewhat greater than the width of the jaw 2. A set screw 9 passes through the base of the L-shaped member 7 to thus firmly hold the bar member 4 to the jaw 2.

The upper portion of the bar member 4 has extending members 10 and 11 which are disposed substantially at right angles to the main portion of the bar to thus give the bar member or frame, viewed from above, a substantially U-shaped appearance, in which the legs or extending portions 10 and 11 are short with reference to the base of the U.

Mounted on cone-shaped bearing members extending through the legs 10 and 11 of the U are a pair of rollers 12 and 13 having their axes parallelly disposed and their upper surfaces extending above the plane of the legs of the U, as will be apparent from an inspection of Fig. 2. These rollers may be so positioned and usually are so positioned, that a plane tangent to the upper portion of both rollers is perpendicular to the somewhat wedge-shaped working plate 14 adjustably mounted on the work engaging surface 6 of the bar member 4.

These rollers 12 and 13 may, however, be so positioned or dimensioned, or both, that a plane tangent to the upper surface of both rollers may make any convenient angle with the face of the working plate 14, but in any case, the axes of the rollers will be disposed parallel. It is thus apparent any abrasive tool rolling over the rollers and operating on a work piece disposed against the working plate 14 will so cut away material on the work piece that the abraded surface of the work piece will fall in a plane, making a selected angle with reference to the vertical face of working plate 14.

Instead of mounting one of the rollers, as for instance 13, higher than the roller 12 which would require adjustable bearings for the roller 13, the same result can be accomplished by merely inserting a roller as 13 that has a diameter greater than that of roller 12 or inserting a roller as 12 greater in diameter than the roller 13. With a roller 13 of a diameter greater than the roller 12, an abrading tool will, of course, cut a work piece in such a way as to form an acute angle adjacent the vertical face of the work plate 14, whereas if the reverse arrangement is adopted the acute angle on the work piece will be on the side of the work piece remote from the face of the work plate 14 contacting with the work piece.

Since the upper edge of the working plate 14 preferably should fall substantially in a plane tangent to both rollers, a change of diameter of but one of the rollers would, as a rule, not be satisfactory because if roller 13 is selected to have a greater diameter relative to roller 12, the abrading tool will, during operation, before it rolls on both rollers, cut into the plate 14, whereas if roller 13 is selected to have a lesser diameter than roller 12, then the work piece is not likely to be held firmly at the region where the abrading action takes place. The difficulties mentioned, of course, arise only if the sizes of the rollers 12 and 13 are so selected and the upper edge of plate 14 is so adjusted that a horizontal plane tangent to both rollers also includes the upper edge of the plate 14 and then a change in the relative size of the rollers is made to disturb this relation.

In this connection, it should be noted that working plate 14 is provided with an inclined guide edge 30 coacting with an inclined guide 31 on the rear face of frame 4. The frame 4 is provided with some slots 32 through which threaded bolts are extended and which bolts have threaded engagement with threaded holes in plate 14. By longitudinally shifting plate 14 on guide edge 31 and tightening bolts 34, any wear on the top edge may be "taken up" and also the top edge 27 may be so positioned that, regardless of the relative size of rollers 12 and 13, a plane tangent to both rollers will include the top edge 27. The angle of the cut on the work piece may thus be selected at will by a proper selection of the relative size of rollers 12 and 13 and the proper adjustment of plate 14.

The bearing pins for the rollers are inserted from the outer sides of the legs 10 and 11 and are held in place by set screws 15 and 16 having conical ends so as to firmly force the bearing pins 17 and 18 against the upper portion of the aperture in the legs for receiving these bearing members 17 and 18.

Figure 4:
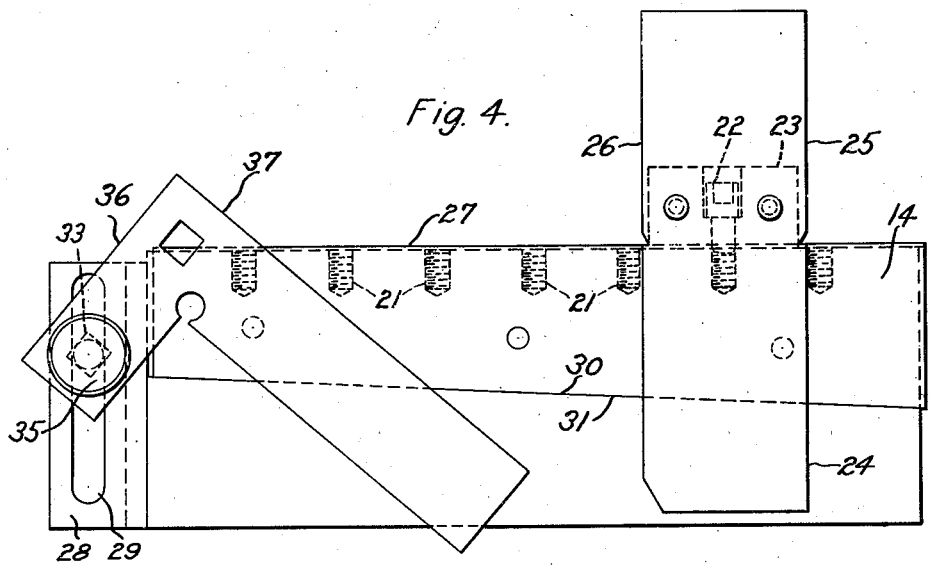
Fig. 4 is a rear view of the subject matter shown in Fig. 3.

The upper surface of the bar 4 is provided with a plurality of holes as 21, for receiving a screw 22 disposed through a lug 23. This lug 23 has a flat surface engaging the top of the bar 4 and carries a work piece engaging strip 24 best shown in Fig. 4. This work piece engaging strip 24 is accurately designed so that its edges 25 and 26 are perpendicular to the upper edge 27 of the work piece engaging strip 14. The lug 23 may thus be shifted to any convenient position on the bar 4 for engaging a work piece for convenient operation thereon by the manually operable abrasive tool.

At the right end of the bar or frame 4 an L-shaped member 28 is rigidly secured to the bar 4 which L-shaped member 28 has a vertically disposed slot 29, the edges of which make a right angle with the work engaging plate 14. A bolt 33 has a rather wide head 35 and a polygonal stem portion which extends for a short distance just below the head 35. This polygonal portion is designed to interfit with either of a pair of like shaped openings on the short end 36 of the square 37. The bolt 33 is provided with a sleeve type nut 38 for firmly holding the square 37 in any position of adjustment.

Figs. 5 and 6 show the rectangular portion 3 to be mounted on the rear jaw of a vise and so far as its general structure is concerned, the block 3 is a plane rectangular member, but is so designed that it may be firmly secured to a U-shaped bracket 40 by means of bolts 41 and 42. This U-shaped bracket 40 has the short legs of the U spaced a distance apart a trifle greater than the width of the rear jaw of the vise and has a set screw 43 extending through one leg of the U for firmly but somewhat pivotally locking the bar 3 on the rear jaw of the vise. To prevent the possibility of the bar 3 moving about the pivot on the vise jaw 1 provided by the set screw 43, the bar is provided with a pair of threaded openings 44 and 45 for receiving a pair of stud bolts 46 and 47. After the bar 3 is secured to the rear jaw 1 of the vise, the stud bolts 46 and 47 may be so positioned with reference to the work piece disposed between the frame 4 and the bar 3 as to avoid any tilting of the bar 3 with reference to the frame 4. Such tilting may only result when the work piece is very narrow and must be gripped by a nipping action to be held in place. The stud bolts 46 and 47 after being adjusted for a given width of work piece, may be held in place by the set screws 48 and 49.

Fig. 2 shows best how such pivotal movement or tilting is prevented. If a narrow strip-like work-piece, having transverse dimensions less than the distance the edge 27 is above the upper surfaces of the vise jaws, is inserted between the jaws, then, as the work-piece is gripped by the attachments, the bars 3 or 4, or both, will tend to tilt. More often bar 3 will tend to move about the axis of set screw 43 as a pivot. To avoid such operation the stud bolts 46 and 47 are caused to protrude from the face of bar 3 substantially by an amount equal to the transverse dimension of the work-piece perpendicular to the faces of the work-piece engaging surfaces of bars 3 and 4. The faces of bars 3 and 4 engaging a work-piece are thus held parallel regardless of how small the work-piece may be.

To get an idea of the operation and utility of my device, it may be assumed that a work piece is to be shaped in a triangular piece having a right angle at one of the corners and having a given size; the attendant selects any work piece having the desired thickness but one which may have no edge conforming to a straight edge nor the dimensions required for the finished piece. This plate-like work piece of any undefined outline is positioned between the frame 4 and the bar 3 and clamped therebetween. The attendant then places the abrasive tool, such as a file, on the roller 13 and reciprocates the file on the work piece until the file or other abrasive tool rotates on the rollers 12 and 13. The work piece is thus provided with one edge. Further, if the rollers are so selected that a tangent to them falls in a plane that is perpendicular to the face of the work-piece then all points of the edge surface fall in the same plane having a right angle to the face of the work piece. The attendant then places the finished edge against the plate 24, which he adjusts to some suitable position for operation thereon, and then operates the file as in the first instance, to produce a working edge on a work piece that is at right angles to the first produced working edge. After the work piece is thus provided with one right angle, the attendant places the work piece against the straight edge of the square 37 and adjusts that square to the position desired to secure the proper sized angles at the other two angles of the right-angled triangular piece, and also so positions the work piece that the finished edge, which will, for the simple finished work piece desired, be the hypoteneuse of the triangle, will have the desired length when finished.

The foregoing brief statement of the utility of my device with reference to a very simple structure does not in any wise limit the utility of my device, because it is readily apparent to anyone skilled in the art that the finished work pieces may take any desired shape, and, regardless of the shape desired, my attachments may be used to produce such desired shape.

I am, of course, aware that others, particularly after having had the benefits of the teachings of my invention, may devise other apparatus for accomplishing the novel results hereinbefore set forth, but the specific showing I have made is not to be taken in a limited sense, but merely illustrative of my invention, and I wish that only such limitations be placed upon it as are necessary in view of the pertinent prior art and the appended claims.

I claim as my invention:

1. In a work piece holding device for holding a work piece so that the work piece may be shaped by means of an abrasive tool, in combination, a vise having conventional jaws, a pair of work piece holding jaws clamped to the jaws of the vise, an adjustable working edge on one of said work piece holding jaws, a pair of parallelly disposed rollers so positioned that a plane tangent to the rollers includes the edge of said working edge, an adjustable work piece positioning member having an edge for engaging the work piece disposed perpendicularly to the said working edge, a second adjustable work piece positioning member having an edge for engaging the work piece which edge may be positioned at any angle with reference to the said working edge.

2. In a device for guiding a flat abrasive tool onto a work piece, in combination, a vise having a pair of jaws, a pair of work piece gripping members one mounted on each of the jaws of the vise, a trapezoidal element adjustably mounted on one of the gripping members and designed to have a plane surface at right angles to the end forming the working edge, and a pair of parallelly disposed rollers mounted on one of the gripping members so positioned that a plane tangent to both rollers will include the working edge and will be perpendicular to the said plane surface of the trapezoidal element.

3. In a device for guiding a flat abrasive tool onto a work piece, in combination, a vise having a pair of jaws, a pair of work piece gripping members one mounted on each of the jaws of the vise, a trapezoidal element adjustably mounted on one of the gripping members and designed to have a straight working edge, and a pair of parallelly disposed rollers mounted on one of the gripping members so positioned that a plane tangent to both rollers also includes the working edge whereby an abrasive tool such as a file, rasp, or other similar tool, when guided over the rollers to operate on the work piece will put a finished surface on the work piece all portions of which fall in the same plane.

4. In a device for guiding an abrasive tool onto a work-piece, in combination, a vise having a pair of jaws, a pair of work-piece gripping members one mounted on each of the jaws of the vise, a plate-like member mounted on one of the gripping members and designed to have a straight-edge, and a pair of parallelly disposed rollers mounted on one of the gripping members, so positioned that a plane tangent to both rollers substantially includes the straight edge.

5. In a device for operating on a work-piece, in combination, a pair of jaws for holding a work-piece, means for preventing tilting of said jaws, a shiftable work-piece positioning means mounted on one of the jaws, a second work-piece positioning means, said second means being designed to be shiftable bodily and angularly adjustable, and a pair of parallelly disposed rollers mounted on the jaws and adapted to guide a cutting tool in its operation on a work-piece so that the cuts on the work-piece while in position between the jaws are made so as to have a definite relation to both of the work-piece positioning means.

HARRY MORRISON.